March 4, 1930.  E. D. OSTRICHER  1,749,224

FRUIT HOLDER

Filed Dec. 29, 1928

INVENTOR
EDWIN D. OSTRICHER
BY
ATTORNEY

Patented Mar. 4, 1930

1,749,224

UNITED STATES PATENT OFFICE

EDWIN D. OSTRICHER, OF WOODBURY, GEORGIA, ASSIGNOR TO THE HILLS BROTHERS COMPANY, OF NEW YORK, N. Y., A CORPORATION OF NEW YORK

FRUIT HOLDER

Application filed December 29, 1928. Serial No. 329,187.

My invention relates to devices for receiving and holding fruit or vegetables during their travel through a treating apparatus. Specifically my invention is well adapted for holding pimientos and like fruit or vegetables while they are being conveyed through a singeing furnace, and it will be particularly described as embodied for that purpose.

Singeing or roasting furnaces for the removal of the skin of the pimiento, as now in use, have a continuous chain with the fruit holders thereon running through an oven at the correct speed to effect the singeing of the skin without injuring the fruit itself. In one form, the pimiento holders have protruding jaws over which the previously cored pimiento is placed and which contract to receive the pimiento and expand to grip the inside of the pimiento.

In practice, it is found that the pimiento frequently falls off these holders before its travel through the furnace is completed, and it is found that this is usually because the pimiento was not originally properly placed over the contracted jaws and held there until gripped by the jaws.

In accordance with my invention I provide a guide which directs the fruit over the contracted jaws so as to assure that it will be correctly gripped by the jaws, and which cooperates with the jaws in retaining the fruit securely on the holder until the jaws are contracted and the fruit is removed therefrom either by gravity or by some positive agency. In one embodiment which has proven satisfactory, particularly in connection with pimientos, the guide comprises a conical core supported by a rod rigidly secured to the fruit holder. This core is substantially the shape of the interior of the cored fruit or vegetable and it is outwardly displaced from the head of the holder so that the jaws extend into a fruit, placed thereover, between the head and the core. The width of the jaws, in their retracted position, is made substantially equal to the diameter of the base of the core, and therefore the core positively guides the fruit over the jaws and on to the head.

A detailed description of one embodiment of the invention will be given in connection with the drawings in which.

Figure 1:
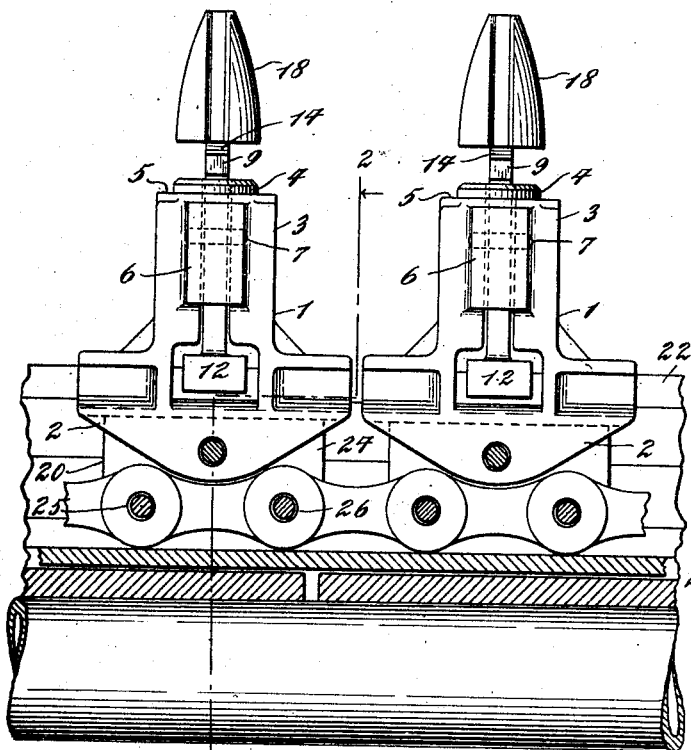
Fig. 1 is a side elevation showing the manner in which the holders are mounted upon a conveyor.
Figure 2:
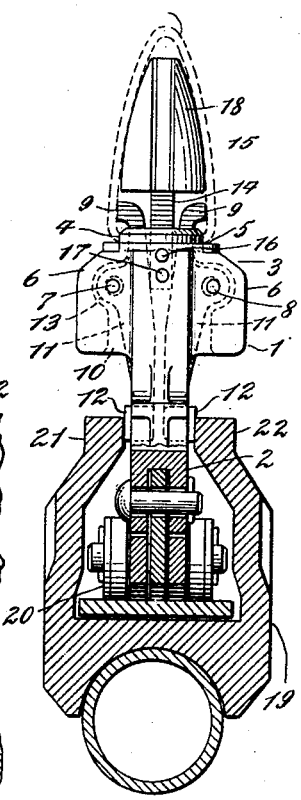
Fig. 2 is a section on the line 2—2 of Fig. 1.
Figure 3:
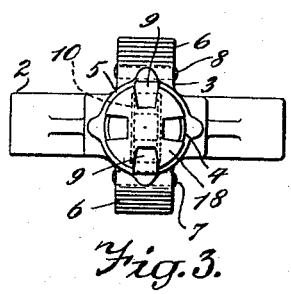
Fig. 3 is a plan view of a holder as shown in Fig. 2.

In the embodiment illustrated, I provide a casting denoted generally by 1 which has a bifurcated flange 2 for attaching the same to a chain conveyor, a somewhat rectangular top portion 3 having machined thereon and extending from the upper face thereof, a circular boss or head 4 which has a diameter substantially the same as the opening cut into a pimiento and over which a pimiento may be placed. Arranged adjacent this head and around the outer periphery thereof is a ledge 5 lower in height and extending only slightly above the upper surface of the top portion 3. This ledge 5 serves as a stop or rest upon which the pimiento, when placed in inverted position upon the head 4, rests. The top portion 3 is further provided with extensions 6 from the opposite sides thereof and provided with pivot holes 7 for receiving pivot pins 8 upon which the jaws or fingers 9 are pivoted. The bifurcated flange 2 depending from the upper portion extends laterally for a substantial distance on opposite sides thereof and is arcuate upon its lower edge. Immediately below the upper portion 3, the flange 2 is cut away providing a space therethrough for purposes to be hereinafter described.

Running through the upper portion 3 and the side extensions 6 is an elongated vertical slot 10 for the reception of the arms 11. These arms 11 are provided, at their upper end, with gripping fingers or jaws 9, and at their lower end they are provided with cam-following shoes 12 which extend through the cut-away portion of the flange 2 hereinbefore referred to for engagement with a cam track. Formed intermediate the ends of the arms 11 and above the center of gravity of the entire pivotal member so that in the normal position of the holder the force of gravity draws the cam shoes apart and the jaws 9 together in a retracted or released position, is a lug portion 13 bored to receive the pivot pin 8. The pivot pin 8 cooperates with the previously mentioned pivot holes 7 in the extensions 6 for pivotally supporting the member 11.

The extensions 6 on the top portion 3 are provided, in this instance, to permit a spaced relation between the members 11 for the reception therebetween of a rod 14 which carries the conical core 15. The rod 14 is rigidly secured to the top portion 1 by means of the two pins 16 and 17, and the core 15 is rigidly secured to the other end thereof.

The core 15 is made to conform substantially to the interior of the cored fruit or vegetable to be carried. In this instance it takes the frusto-conical shape shown which conforms to that of the interior of a cored pimiento. Channels 18 are provided along the surface of the core running parallel to the longitudinal axis thereof. These channels 18 facilitate the placing of a pimiento thereover. The diameter of the base of the core is made equal to the distance between the outer tips of the jaws 9 in the retracted position and thus the core serves to spread the pimiento and positively guide it over the retracted gripping fingers and on to the head 4 as it is pressed down over the holder.

A U-shaped member 19 is provided for housing the chain conveyor 20, the upper side arms 21 and 22 providing a cam track for the actuation of the gripping fingers 9 through the medium of the cam shoes or followers 12 and arms 11. The control of the gripping fingers 9 is accomplished by varying the distance between the cam tracks, the tracks converging to expand the fingers and diverging to permit the force of gravity to retract the fingers. The housing 19 is supported upon a tubular support 23 which may be connected to a supply of cold water (not shown) for cooling purposes.

In practice, the supporting heads are used in multiple, being attached to an endless conveyor. For this reason, the bifurcated web 2 hereinbefore referred to is provided with a pivotal connection to a link 24 which may, if desired, be connected to the conveyor at a plurality of points as 25 and 26.

In the operation of the device, as the holder approaches the furnace a pimiento is placed thereover, the core 15 guiding the pimiento over the retracted jaws 9 and on to the boss or head 4. The cams 21 and 22 converge as the holder approaches the furnace, pressing the cam shoes 12 together, swinging the arms 11 on their pivots 13, thereby separating the fingers 9 to grasp the pimiento firmly. The cams remain converged during the passage of the holder through the furnace and at the opposite end they diverge, releasing the shoes 12 which fall outward by the force of gravity acting thereon to retract the fingers 9 and release the pimiento. The pimiento may then be removed by hand or by the force of gravity when the holder assumes an inverted position during its return travel on a chain conveyor moving in a vertical plane. The removal of the pimiento clears the holder and as it swings into an upright position it is ready to receive another pimiento as before.

It is obvious that various changes may be made in the specific construction of the illustrated embodiment and therefore the invention should be construed in the scope of the appended claims.

I claim:

1. A fruit holder for use in fruit treating apparatus comprising a head adapted to support a previously cored fruit thereover; movable fingers adapted to extend into the fruit on said head and engage the inner surface thereof to frictionally hold the fruit on said head, and means to guide the fruit over said fingers and on to said head.

2. A fruit holder for use in fruit treating apparatus comprising a head adapted to support a previously cored fruit thereover, movable fingers extending above said head and into the fruit to frictionally hold the fruit on said head, a core vertically displaced from said head and above said fingers and adapted to guide the fruit over said fingers and on to said head.

3. A fruit holder for use in a fruit treating apparatus comprising a head adapted to support a previously cored fruit thereover, movable fingers extending above said head and into said fruit, a core vertically displaced from said head and above said fingers, the diameter of the base of said core being substantially equal to the spread of said fingers in their retracted position.

4. A fruit holder for use in a fruit treating apparatus comprising a head adapted to support a previously cored fruit thereover, a rod secured to said head adapted to support a core thereon, movable fingers extending between said head and said core and into said fruit to frictionally hold the fruit on said head, said core serving to guide the fruit over said fingers and on to said head.

5. A fruit holder for use in a fruit treating apparatus comprising a head adapted to support a previously cored fruit thereover, a ledge around the outer periphery thereof and adapted to cooperate therewith, a rod centrally secured to said head having a core secured thereto, movable fingers extending between said head and said core and adapted to enter said fruit to frictionally hold the fruit on said head.

In testimony whereof I affix my signature.

EDWIN D. OSTRICHER.